United States Patent
Wu

(10) Patent No.: US 9,575,190 B2
(45) Date of Patent: Feb. 21, 2017

(54) FLAT PANEL X-RAY DETECTOR

(71) Applicant: InnoLux Corporation, Miao-Li County (TW)

(72) Inventor: Chih-Hao Wu, Miao-Li County (TW)

(73) Assignee: INNOLUX CORPORATION (TW)

( * ) Notice: Subject to any disclaimer, the term of this patent is extended or adjusted under 35 U.S.C. 154(b) by 305 days.

(21) Appl. No.: 14/063,018

(22) Filed: Oct. 25, 2013

(65) Prior Publication Data

US 2014/0145085 A1 May 29, 2014

(30) Foreign Application Priority Data

Nov. 23, 2012 (TW) .............................. 101143908 A

(51) Int. Cl.
*G01T 1/20* (2006.01)
(52) U.S. Cl.
CPC .................................... *G01T 1/2018* (2013.01)
(58) Field of Classification Search
CPC ................................................... G01T 1/1642
See application file for complete search history.

(56) References Cited

U.S. PATENT DOCUMENTS

| | | | |
|---|---|---|---|
| 5,430,298 A * | 7/1995 | Possin et al. | 250/370.11 |
| 5,844,289 A * | 12/1998 | Teranishi et al. | 257/432 |
| 6,178,224 B1 * | 1/2001 | Polichar et al. | 378/98.2 |
| 7,289,602 B1 * | 10/2007 | Polichar et al. | 378/98.8 |
| 2008/0116381 A1 * | 5/2008 | Kondo et al. | 250/361 R |
| 2008/0290280 A1 | 11/2008 | Ruetten et al. | |
| 2011/0180890 A1 * | 7/2011 | Sato | 257/429 |
| 2011/0248366 A1 * | 10/2011 | Saito et al. | 257/429 |
| 2012/0126129 A1 * | 5/2012 | Nakatsugawa et al. | 250/369 |
| 2012/0201350 A1 | 8/2012 | Kim | |
| 2012/0241627 A1 | 9/2012 | Noda et al. | |
| 2013/0048861 A1 * | 2/2013 | Ohta et al. | 250/366 |

FOREIGN PATENT DOCUMENTS

CN 101893717 A 11/2010

* cited by examiner

*Primary Examiner* — David Porta
*Assistant Examiner* — Hugh H Maupin
(74) *Attorney, Agent, or Firm* — Bacon & Thomas, PLLC

(57) ABSTRACT

The present invention relates to a flat panel X-ray detector, which comprises a thin film transistor (TFT) substrate; a photoelectric detecting layer, which is disposed on and electrically connected with the TFT substrate, wherein the photoelectric detecting layer comprises a plurality of photoelectric detecting units and a plurality of light absorption units, and the light absorption unit is disposed between spaces adjacent to the photoelectric detecting unit; a Scintillation layer, which is disposed on the photoelectric detecting layer; and a reflective layer, which is disposed on the Scintillation layer.

3 Claims, 4 Drawing Sheets

FLAT PANEL X-RAY DETECTOR

CROSS REFERENCE TO RELATED APPLICATION

This application claims the benefits of the Taiwan Patent Application Serial Number 101143908, filed on Nov. 23, 2012, the subject matter of which is incorporated herein by reference.

BACKGROUND OF THE INVENTION

1. Field of the Invention

The present invention relates to an X-ray flat panel detector, wherein the times of light reflection therein can be reduced and the accuracy of image detection can be improved by modifying the internal structure thereof.

2. Description of Related Art

X-ray flat panel detector is a device that detects X-ray digital images, which can be applied to general digital radiography (DR) and digital mammography In comparison to screen-film detector system and computed radiography (CR), digital radiography (DR) has the advantages of improved image quality, simple operating procedures, and direct digital imaging.

The indirect X-ray flat panel detector is operated sequentially by converting X-rays into visible light signals through a Scintillation layer (Scintillator), converting the visible light signals into electrical signals via a photoelectric detecting layer and a thin film transistor layer, and then converting the electrical signals into a digital image. Since the photoelectric detecting layer is formed by arranging the photoelectric detecting units into an array, the metal wires of the thin film transistors may be observed from the gaps between adjacent photoelectric detecting units. From a top-view of the photoelectric detecting layer, it is estimated that about 65% of the observed area is arranged by the photoelectric detecting units, and about 25% thereof is arranged by the metal wires of the thin film transistors. When the visible light signals converted by the Scintillation layer diverge to the metal wires, the visible light signals are reflected by the metal wires and reflected back to the photoelectric detecting layer through a reflective layer. However, the accuracy of the detected image may be decreased due to extreme light shifts when the converted visible light signals are reflected too many times.

Accordingly, in order to improve the sharpness and the accuracy of the detected images, it is desirable to develop an X-ray flat panel detector which can reduce the times of reflection of visible light in the Scintillation layer.

SUMMARY OF THE INVENTION

The object of the present invention is to provide an X-ray flat panel detector which can produce images with improved sharpness and accuracy by reducing the times of reflections of visible light in a Scintillation layer.

To achieve the object, an X-ray flat panel detector is provided in the present invention, which comprises: a thin film transistor (TFT) substrate; a photoelectric detecting layer, which is disposed on and electrically connected with the TFT substrate, wherein the photoelectric detecting layer comprises a plurality of photoelectric detecting units and a plurality of light absorption units, and the light absorption units are disposed in gaps between adjacent photoelectric detecting units; a Scintillation layer, which is disposed on the photoelectric detecting layer; and a reflective layer, which is disposed on the Scintillation layer.

The X-ray flat panel detector described above further comprises a carbon fiber layer disposed on the reflective layer. Here, the carbon fiber layer can prevented the penetration of the X-ray into the Scintillation layer being interfered and absorb visible light. In addition to the above-mentioned embodiment, in the case that the carbon fiber layer is disposed on the reflective layer, the reflective layer in the X-ray flat panel detector of the present invention can be a reflective array layer, wherein the reflective array layer may include a plurality of reflective zones, and projection positions of the reflective zones correspond to positions of the photoelectric detecting units. When the visible light converted by the Scintillation layer diverges into the gaps between the reflective zones, the visible light can be absorbed by the carbon fiber layer and the re-reflection thereof can further be avoided. Hence, an improved accuracy of the detected image is achieved.

Further, in addition to the above-mentioned embodiment, the present invention provides an X-ray flat panel detector, which comprises: a TFT substrate; a photoelectric detecting layer, which is disposed on and electrically connected with the TFT substrate, wherein the photoelectric detecting layer comprises a plurality of photoelectric detecting units; a micro-lens array layer, which is disposed on the photoelectric detecting layer, wherein the micro-lens array layer comprises a plurality of micro-lens; a Scintillation layer, which is disposed on the photoelectric detecting layer; and a reflective layer, which is disposed on the Scintillation layer.

The above-mentioned embodiments of the X-ray flat panel detector can further comprise a first light transmitting layer disposed on the micro-lens array layer.

In addition, the X-ray flat panel can further comprise a second light transmitting layer sandwiched between the micro-lens array and the first light transmitting layer, and the refractive index of the second light transmitting layer is larger than that of the first light transmitting layer. Hence, the effect of the light concentration or gathering can further be increased or improved.

DETAILED DESCRIPTION OF THE PREFERRED EMBODIMENT

The following detailed description of the embodiments of the present invention is described herein. For a person skilled in the art, the present invention, advantages, and effects can be easily understood refer to the features disclosed in the specification. Furthermore, it is to be understood that many other possible modifications and variations can be made without departing from the spirit and scope of the invention as hereinafter claimed.

Figure 1:
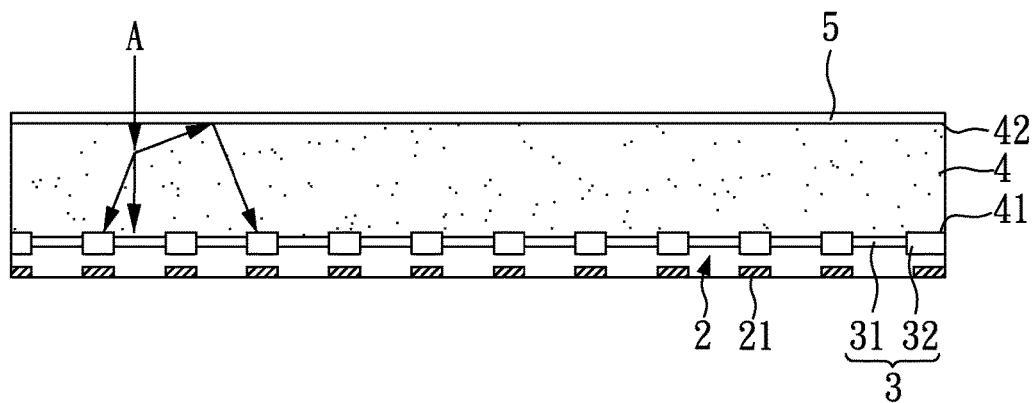
FIG. 1 is a cross-sectional view showing an X-ray flat panel detector in accordance with an embodiment of the present invention.
Figure 2:
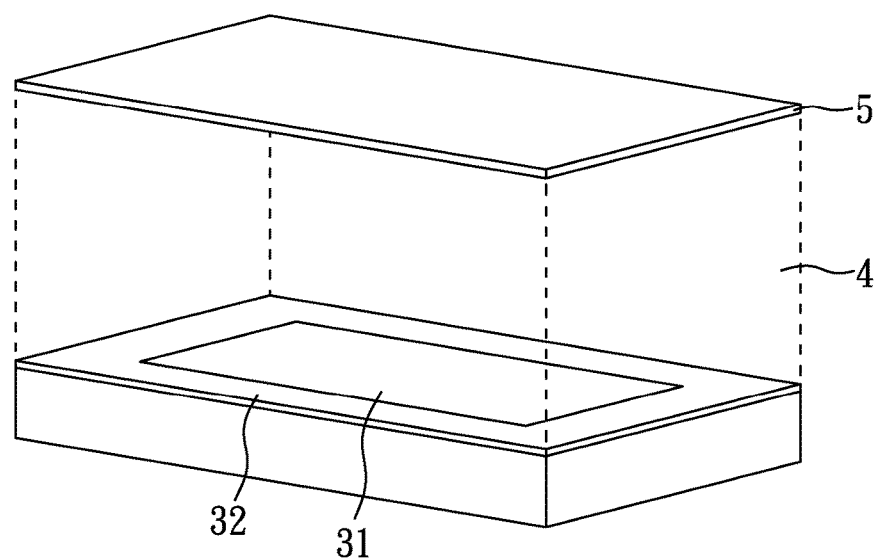
FIG. 2 is a perspective view showing an X-ray flat panel detector in accordance with an embodiment of the present invention.

With reference to FIG. 1 and FIG. 2, FIG. 1 is a cross-section view of an X-ray flat panel detector of one embodiment of the present invention; and FIG. 2 is a perspective view thereof.

The X-ray flat panel detector shown in FIG. 1 and FIG. 2 comprises: a thin film transistor substrate 2; a photoelectric detecting layer 3, which is electrically connected to the thin film transistor substrate 2, wherein the photoelectric detecting layer 3 includes a plurality of photoelectric detecting units 31 (such as photoelectric diodes) and a plurality of light absorption units 32, and the light absorption units 32 are formed by a light absorption material and disposed in the gaps between adjacent photoelectric detecting units 31; a Scintillation layer 4 including a first side 41 and a second side 42, wherein the Scintillation layer 4 is connected to the photoelectric detecting layer 3 via the first side 41; and a reflective layer 5, which is disposed on the second side 42 of the Scintillation layer 4.

When the X-ray penetrates into the Scintillation layer 4, the Scintillation layer 4 converts the X-ray into visible light (530 nm wavelength), and then the converted visible light diverges in the Scintillation layer 4 in all directions. Partial visible light directly diverges to the photoelectric detecting units 31 and is converted into electrical signals directly; and partial visible light is reflected by the reflective layer 5 and then reaches to the photoelectric detecting units 31. In addition, partial visible light that diverges directly or indirectly to the metal wires 21 of the thin film transistor substrate 2 will be absorbed by the light absorption units 32, so the times of the reflections of visible light in the Scintillation layer 4 can further be reduced.

The materials used for the Scintillation layer described above can be the materials converting X-ray into visible light, such as: CsI:Tl, $Gd_2O_2S$:Tb etc. Additionally, other possible materials such as CsI:Na, $CaWO_4$, $CdWO_4$, NaI:Tl, $BaFCl:Eu^{2+}$, $BaSO_4:Eu^{2+}$, $BaFBr:Eu^{2+}$, $LaOBr:Tb^{3+}$, $LaOBr:Tm^{3+}$, $La_2O_2S:Tb^{3+}$, $YTaO_4$, $YTaO_4$:Nb, ZnS:Ag, $ZnSiO_4:Mn^{2+}$, $LiI:Eu^{2+}$, or $CeF_3$ can also be used.

Thus, the device of the present embodiment shown in FIG. 1 and FIG. 2 is not only reduce the multiple reflections of visible light in the Scintillation layer 4, but also avoid the optical signal shifts due to the multiple reflections of visible light. Therefore, the accuracy of the detected images can be improved.

Figure 3:
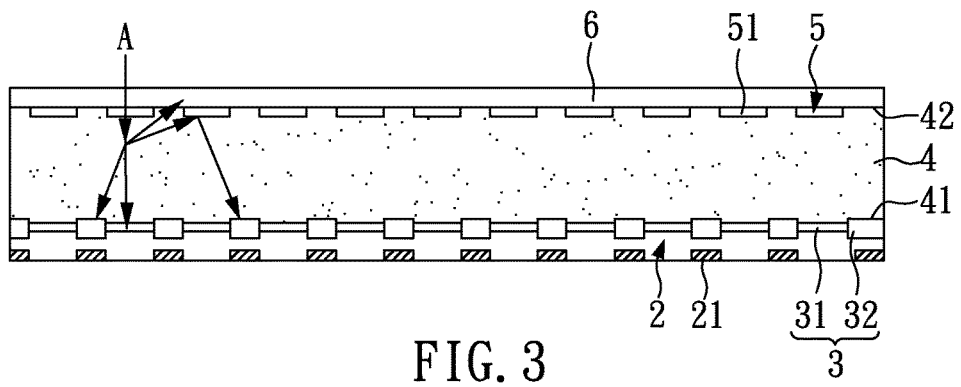
FIG. 3 is a cross-sectional view showing an X-ray flat panel detector in accordance with an embodiment of the present invention.
Figure 4:
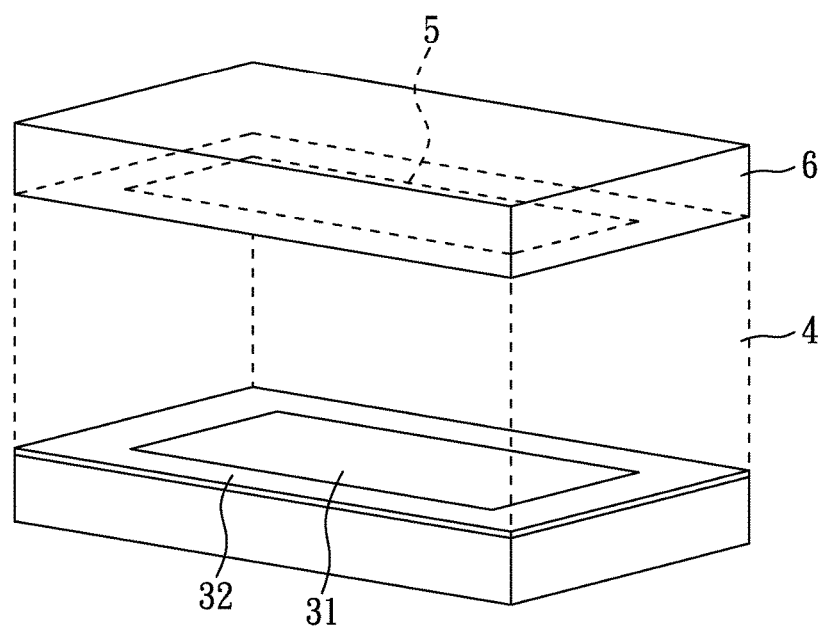
FIG. 4 is a perspective view showing an X-ray flat panel detector in accordance with an embodiment of the present invention.

Referring to FIG. 3 and FIG. 4, FIG. 3 is a cross-section view of an X-ray flat panel detector in accordance to another embodiment of the present invention; and FIG. 4 is a perspective view thereof.

The X-ray flat panel detector shown in FIG. 3 and FIG. 4 is substantially the same as that shown in FIG. 1 and FIG. 2, except that the reflective layer 5 in FIG. 3 and FIG. 4 is a reflective array layer which is formed by a plurality of reflective zones 51, and light can penetrates through the spaces between the reflective zones 51. In addition, the X-ray flat panel detector of the present embodiment further comprises a carbon fiber layer 6 characterized in that the penetration of the X-ray A into the Scintillation layer 4 is not interfered and the visible light can be absorbed by the carbon fiber layer 6.

In addition, for each of the reflective zones shown in FIG. 3 and FIG. 4, the projection positions thereof respectively correspond to the positions of the photoelectric detecting units 31 of the photoelectric detecting layer 3. For the aforementioned embodiment shown in FIG. 1 and FIG. 2, partial visible light may be firstly reflected by the reflective layer 5 and then reaches to the photoelectric detecting units 31. In the present embodiment shown in FIG. 3 and FIG. 4, the reflective zones 51 of the reflective layer 5 are only disposed on the projection positions thereof which respectively correspond to the positions of the photoelectric detecting units 31 of the photoelectric detecting layer 3, and the remaining part other than the reflective zones 51 of the reflective layer 5 is hollow (or empty) spaces. Therefore, partial light may penetrate directly through the hollow spaces between the reflective zones 51 of the reflective layer 5 and be absorbed by the carbon fiber layer 6. Therefore, it is able to reduce the optical signal shifts due to multiple reflections of visible light between the first side 41 and the second side 42 of the Scintillation layer 4. Thus the problem of image distortion can be prevented, and the sharpness of the obtained images is improved.

Figure 5:
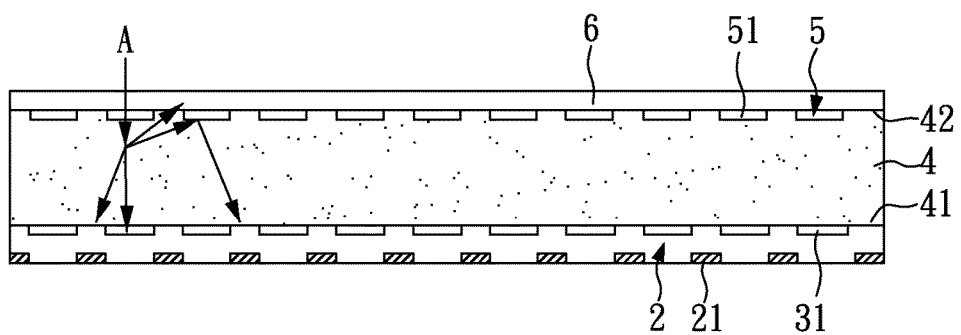
FIG. 5 is a schematic view showing an X-ray flat panel detector in accordance with an embodiment of the present invention.

Referring to FIG. 5, the X-ray flat panel detector shown in FIG. 5 is substantially the same as that shown in FIG. 3 and FIG. 4, except that the photoelectric detecting layer 3 of the present embodiment comprises a plurality of photoelectric detecting units 31 and does not comprise the aforementioned light absorption units. For the reason that each of the projection positions of the reflective zones 51 respectively corresponds to one position of the photoelectric detecting units 31 of the photoelectric detecting layer 3, the device of the present embodiment shown in FIG. 5 is able to reduce image distortions and improve the sharpness of the obtained images.

Figure 6:
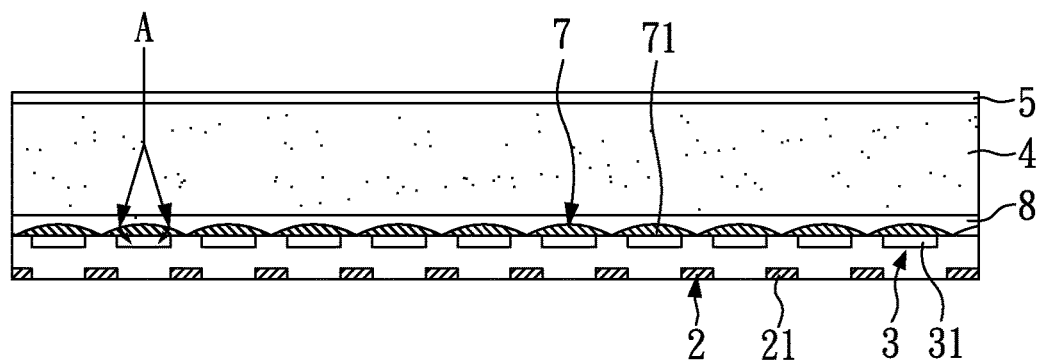
FIG. 6 is a cross-sectional view showing an X-ray flat panel detector in accordance with an embodiment of the present invention.
Figure 7:
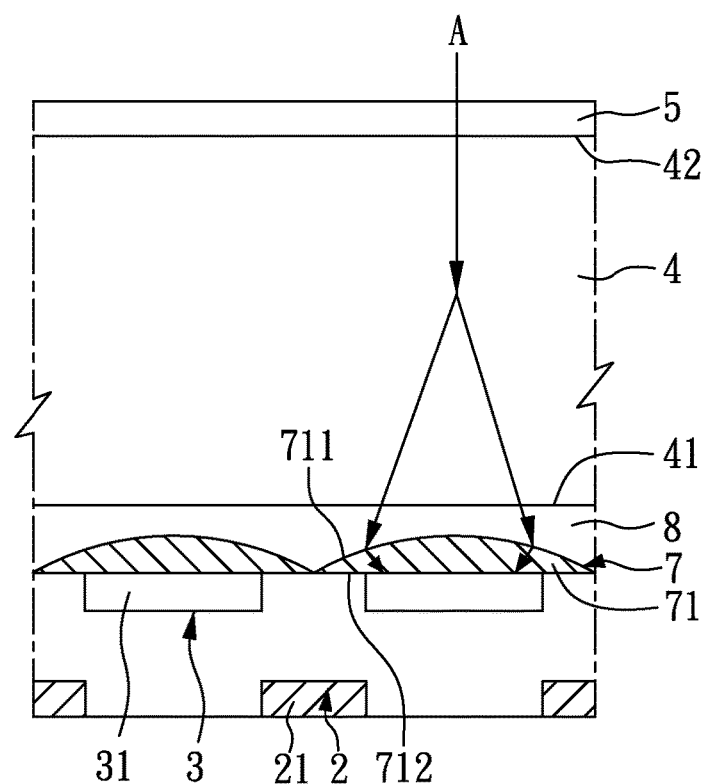
FIG. 7 is a partially enlarged view of FIG. 6.

Referring to FIG. 6 and FIG. 7, FIG. 6 is a cross-sectional view of another X-ray flat panel detector of the present invention; and FIG. 7 is a partially enlarged view of FIG. 6.

The X-ray flat panel detector of the present embodiment shown in FIG. 6 and FIG. 7 comprises: a thin film transistor (TFT) substrate 2; a photoelectric detecting layer 3, which is disposed on and electrically connected with the TFT substrate 2, and comprises a plurality of photoelectric detecting units 31; a micro-lens array layer 7, which comprises a plurality of micro-lens 71, wherein each of the micro-lens 71 respectively includes a curved surface 711 and a bottom surface 712, each of the micro-lens 71 is respectively disposed on one of the photoelectric detecting units 31 through the bottom surface 712 of the micro-lens 71, and the curved surface 711 of each of the micro-lens 71 covers the edges of each of the photoelectric detecting units 31; a first light transmitting layer 8, which is disposed on the micro-lens array layer 7; a Scintillation layer 4 having a first side 41 and a second side 42, wherein the Scintillation layer 4 connects to the first light transmitting layer 8 via the first side 41 of the Scintillation layer 4; and a reflective layer 5, which is disposed on the second side 42 of the Scintillation layer 4.

The aforementioned first light transmitting layer 8 is used to cover the micro-lens array layer 7 for the purpose of flattening the surface the micro-lens array layer 7 in order to dispose the Scintillation layer 4 thereon. Further, the first light transmitting layer 8 can also be used for assisting the light-concentration or gathering of the micro-lens array layer 7. More specifically, when the refractive index of the micro-lens array layer 7 is larger than that of the first light transmitting layer 8, the first light transmitting layer 8 is able to improve the effect of the light-concentration or gathering of the micro-lens array layer 7. Preferably, the ratio of the refractive index of the micro-lens array layer 7 to that of the first light transmitting layer 8 is larger than 1. Further, the preferred material for the first light transmitting layer 8 is optical glue (which has a refractive index of 1.4-1.5).

In the micro-lens array layer 7, each of the micro-lens 71 must at least have a curved surface 711 at the position where the micro-lens 71 covering the edges of photoelectric detecting units 31 to concentrate the diverged visible light to the corresponding photoelectric detecting units 31, in order to improve the utilization of the visible light. Furthermore, the micro-lens 71 is not necessarily required to have a continuous and overall curved surface 711. For instance, except that the surface of the micro-lens 71 corresponding to the position where the micro-lens 71 covering the edges of photoelectric detecting units 31 is a curved surface 711, the remaining surface of the micro-lens 71 can be a flat surface.

Figure 8:
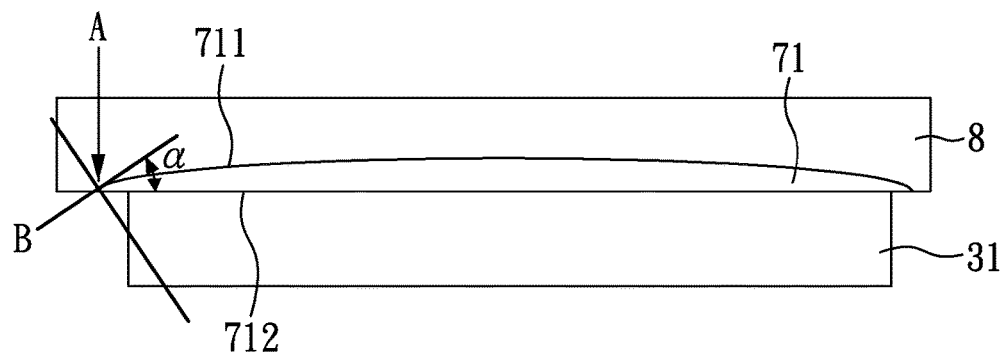
FIG. 8 is a partial cross-sectional view showing an X-ray flat panel detector in accordance with an embodiment of the present invention.

Referring to FIG. 8, which is a partial cross-section view of an X-ray flat panel detector in accordance to one embodiment of the present invention. In the present embodiment, an included angle a between the tangent of the junction of the curved surface 711 and the bottom surface 712 of the micro-lens 71 and the bottom surface 712 of the micro-lens 71.

The range of the included angle can be adjusted in accordance to the material of the micro-lens 71, the distance between the adjacent photoelectric detecting units 31, or the length and width of the photoelectric detecting units 31. An included angle between 15°-65° is preferred, and the material used for the micro-lens 71 is preferred to be polyfluoroalkoxy (PFA) (which has a refractive index of 1.4-1.6).

According to the embodiment shown is FIG. 8, the material of the micro-lens 71 is PFA (which has a refractive index of 1.55), the material of the first light transmitting layer 8 is optical glue (which has a refractive index of 1.45), and the included angle α is 35°. According to the Snell's law, when the incident angle is 35°, the refractive angle of the micro-lens 71 is 32.5°. This result indicates that the effect of light-concentration is achieved by using the micro-lens array layer 7 and the first light transmitting layer 8 of the present embodiment.

Figure 9:
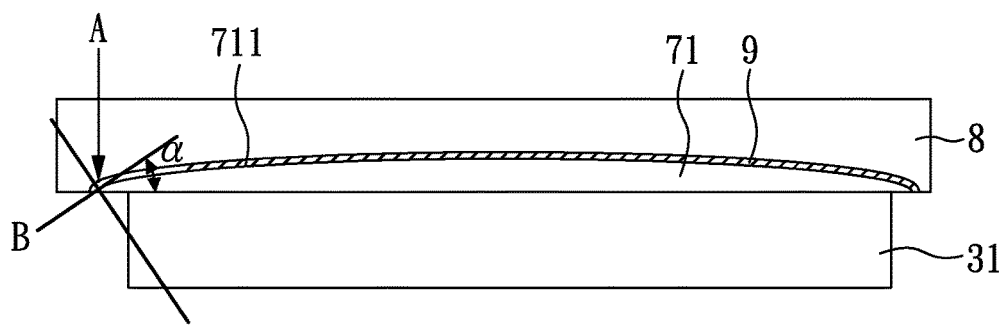
FIG. 9 is a partial cross-sectional view showing an X-ray flat panel detector in accordance with an embodiment of the present invention.

FIG. 9 is a partial cross-section view of an X-ray flat panel detector in accordance to another embodiment of the present invention.

The embodiment shown in FIG. 9 is substantially the same as the embodiment shown in FIG. 8, except that a second light transmitting layer 9 is further comprised between the micro-lens array layer 7 and the first light transmitting layer 8 of the embodiment shown in FIG. 9. Thus, the light-concentration effect is further improved. Specifically, when the X-ray flat panel detector of the present embodiment comprises a second light transmitting layer 9, the refractive index of the second light transmitting layer 9 is larger than that of the first light transmitting layer 8. In this case, the light-concentration effect of the micro-lens array layer 7 can further be improved and the utilization of the visible light is also improved. Further, when the difference between the refractive index of the micro-lens array layer 7 and that of the first light transmitting layer 8 is too small, the second light transmitting layer 9 is able to adjust the deflection rate of the visible light, in order to improve the light-concentration effect of the first light transmitting layer 8 and the micro-lens array layer 7. More specifically, when the difference between the refractive index of the micro-lens array layer 7 and that of the first light transmitting layer 8 is too small, the material used for the second light transmitting layer 9 should have a higher refractive index to improve the light-concentration effect of the micro-lens array layer 7. Basically, the refractive indexes of the micro-lens array layer 7, the first light transmitting layer 8, and the second light transmitting layer 9 depends on the materials thereof, which are chosen according the required light-concentration effect.

For instance, when the refractive index of the micro-lens 71 is close to the refractive index (1.45) of the first light transmitting layer 8, in order to improve the light-concentration effect, a second light transmitting layer 9 is disposed between the micro-lens 71 and the first light transmitting layer 8 to improve the deflection angle of the refractive light.

In this case, the material used for the second light transmitting layer 9 is SiNx with refractive index of 1.9.

According to the Snell's law, when the incident angle is 35°, the refractive angle of the incident light into the second light transmitting layer is 26°. This result indicates that the second light transmitting layer 9 is used to adjust the incident angle of the incident light into the micro-lens 71 to improve the light-concentration effect and the utilization of visible light.

Although the present invention has been explained in relation to its preferred embodiment, it is to be understood that many other possible modifications and variations can be made without departing from the spirit and scope of the invention as hereinafter claimed.

What is claimed is:

1. An X-ray flat panel detector, comprising:
   a thin film transistor (TFT) substrate;
   a photoelectric detecting layer, disposed on and electrically connected with the TFT substrate, wherein the photoelectric detecting layer comprises a plurality of photoelectric detecting units and a plurality of light absorption units which absorb visible light with a wavelength of 530 nm, and the light absorption units are disposed in spaces between adjacent photoelectric detecting units;
   a Scintillation layer, disposed on the photoelectric detecting layer; and
   a reflective layer, disposed on the Scintillation layer;
   wherein the reflective layer includes a plurality of reflective zones and a plurality of hollow spaces disposed in spaces between adjacent reflective zones, and the projection positions of the reflective zones on the thin film transistor substrate correspond to the positions of the photoelectric detecting units on the thin film transistor substrate.

2. The X-ray flat panel detector as claimed in claim 1, further comprising a carbon fiber layer disposed on the reflective layer.

3. The X-ray flat panel detector as claimed in claim 1, wherein the light absorption unit includes a light absorption material.

* * * * *